Jan. 12, 1932.   J. R. CAUTLEY   1,840,808
BRAKE
Filed Oct. 23, 1929

INVENTOR
JOHN R. CAUTLEY
BY H. Q. Clayton
ATTORNEY

Patented Jan. 12, 1932

1,840,808

UNITED STATES PATENT OFFICE

JOHN R. CAUTLEY, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 23, 1929. Serial No. 401,633.

This invention relates to brakes and is illustrated as embodied in a brake adapted for use on airplane wheels.

The invention is adapted for brakes of the full-wrapping type and more particularly of that type of brake employing a plurality of articulated friction segments. With the tremendous forces set up in brakes of this type deriving their braking energy in large measure from the inertia of the moving vehicle, the problem of making the joints between the segments of the brake sufficiently strong is a very serious one. These articulating connections which are floating are subject to unusual stresses such as those tending to throw the segments of the brake out of alignment one with another. To the end of providing a sufficiently flexible and yet strong floating joint, I am suggesting the novel type of construction described hereafter. I suggest that the adjacent radially extending reinforcing webs of the braking segments be offset from the plane of the web at the joint so that the said webs of the segments overlap at said joint, the center line of the webs being in prolongation one with the other and which line therefore passes through the geometrical transverse center of the joint. The line of action of the force transmitted from the servo shoe to the secondary shoe thus passes through the center of the joint, obviating any overhang in the joint which would cause "cocking" of the joint.

In one embodiment of my invention, as disclosed, I have provided overlapping ends of the adjacent webs with said portions offset from the plane of the web by an amount equal to one-half the thickness thereof to obtain the aforementioned result and, if desired, there may be provided reinforcing plates in juxtaposition with the aforementioned ends to provide a four-ply thickness at the joint, the geometrical center of which, as pointed out, lies in the center line of the respective webs.

The above and other objects and features of the invention, together with desirable details of construction will be more clearly brought out in the following detailed description of the preferred embodiment of my invention disclosed in the drawings, in which.

Figure 1:
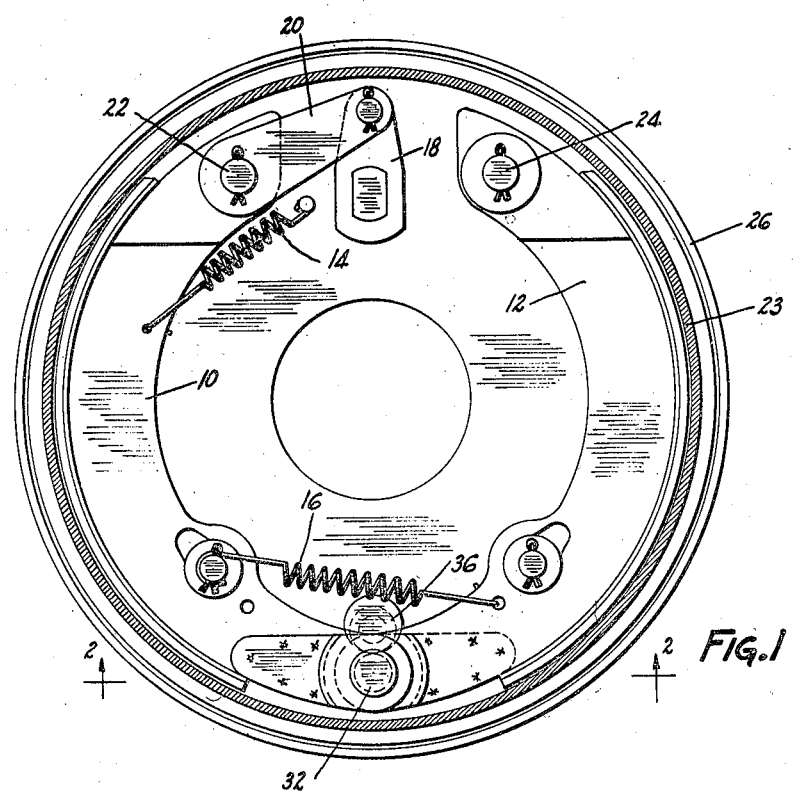
Figure 1 is a side elevation of a two-shoe full-wrapping brake with my novel floating joint incorporated therein.

As previously mentioned, my invention is adapted to be utilized in a multiple segment internal expanding brake of the one-way acting type, although it is obvious that the joint may be employed with other types of floating or full-wrapping brakes. As disclosed in Figure 1, two interchangeable brake shoes 10 and 12 are adapted to be expanded into drum contact, against the resistance of springs 14 and 16, by a crank arm 18 pivotally connected to the thrust link 20 pivoted at its end 22 to the end of the shoe 10. Shoe 10 serves through my novel floating articulating joint to apply shoe 12 to the rotating drum 23, the torque of both shoes being taken on pivot 24 fixedly secured to the brake support 26.

According to an important feature of my invention, there is provided a very simple and yet exceedingly strong and effective floating joint between the aforementioned brake shoes. I suggest, as disclosed in Figure 2, that the webs of the two shoes be aligned one with respect to the other and that their extreme ends be overlapped and offset one-half thickness of the web to thus position the abutting faces of the web ends in the plane of the center line of the aligned webs.

Figure 2:
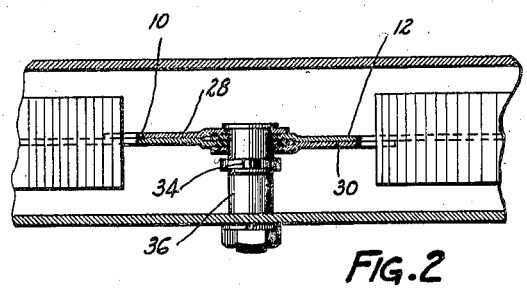
Figure 2 is a partial transverse section on the line 2—2 of Figure 1 showing the joint in more detail.
Figure 3:
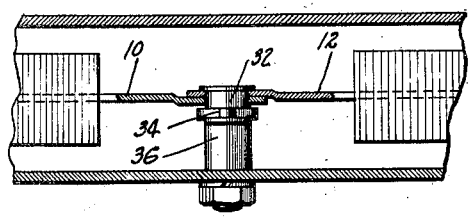
Figure 3 is a similar showing of the joint with the reinforcing plates removed.

If desired, this joint may be reinforced by plates 28 and 30 projection welded or otherwise rigidly secured to the respective ends of the webs and which reinforcing plates are offset in a direction opposite to that of their webs, the degree of offset also being substantially one-half the thickness of the plates. This construction, as clearly disclosed in Figure 2, provides a four-ply joint, the geometrical center of the joint lying within a plane through the center line of the webs. The overlapping portions of either the webs in Figure 3 or the webs and plates in Figure 2 are orificed to provide a circular opening for a pivot pin 32 flanged at its end to abut the side of the joint and obviate lateral movement of the pin in one direction and recessed immediately adjacent its other end at 34 to receive an eccentrically mounted adjustable stop 36 determining the idle position of the brake.

In operation, actuation of the servo shoe 10 serves to transmit through the floating joint an applying force to the shoe 12 and, by virtue of the particular construction and arrangement of the parts of the joint, said force is transmitted directly through its geometrical center. This construction obviates any possible tilting or cocking of the pin 32 and in a measure insures a predetermined path to the rotating shoes.

While two particular embodiments of my invention have been described in detail, it is not my intention to limit the scope of the invention to those particular embodiments or otherwise than by the terms of the appended claims.

I claim:

1. A brake comprising, in combination, friction elements having webs provided with inter-leafed portions pivotally connected by a joint, the geometrical transverse center of which joint lies within a plane passing through the longitudinal center of said webs.

2. A brake comprising, in combination, floating friction elements having webs provided with inter-leafed portions pivotally connected by a floating joint, the geometrical transverse center of which joint lies within a plane passing through the longitudinal center of the web portions of said elements.

3. A floating articulating joint between segments of a brake comprising web portions of said segments overlapped at their ends each offset, at the overlapped portions, from the center line of said webs by an amount equal to substantially one-half the thickness thereof.

4. A floating articulating joint between segments of a brake comprising web portions of said segments overlapped at their ends each offset, at the overlapped portions, from the center line of said webs by an amount equal to substantially one-half the thickness thereof, together with a pivot pin passing through said portions, the geometrical center of which lies within the plane of the web portions.

5. A floating articulating joint between segments of a brake comprising web portions of said segments overlapped at their ends each offset, at the overlapped portions, from the center line of said webs by an amount equal to substantially one-half the thickness thereof, together with reinforcing plates secured to said portions to provide a four-ply thickness joint.

6. A floating articulating joint between segments of a brake comprising web portions of said segments overlapped at their ends each offset, at the overlapped portions, from the center line of said webs by an amount equal to substantially one-half the thickness thereof, together with reinforcing plates secured to said portions to provide a four-ply thickness joint, each of said plates being offset at said joint by an amount equal to one-half the thickness of said plate.

In testimony whereof, I have hereunto signed my name.

JOHN R. CAUTLEY.